(12) United States Patent
Sicilia et al.

(10) Patent No.: US 7,179,081 B2
(45) Date of Patent: Feb. 20, 2007

(54) FRONT-MOUNTABLE, EDGE-GATING NOZZLE

(75) Inventors: Robert Sicilia, Mississauga (CA);
Terry Schwenk, Kenosha, WI (US)

(73) Assignee: Mold-Masters Limited, Georgetown (CA)

( * ) Notice: Subject to any disclaimer, the term of this patent is extended or adjusted under 35 U.S.C. 154(b) by 456 days.

(21) Appl. No.: 10/819,165

(22) Filed: Apr. 7, 2004

(65) Prior Publication Data
US 2005/0019444 A1 Jan. 27, 2005

Related U.S. Application Data

(60) Provisional application No. 60/460,418, filed on Apr. 7, 2003.

(51) Int. Cl.
*B29C 45/20* (2006.01)
(52) U.S. Cl. ............... 425/549; 264/328.15; 425/572
(58) Field of Classification Search ............. 425/549, 425/568, 572; 264/328.15
See application file for complete search history.

(56) References Cited

U.S. PATENT DOCUMENTS

| | | | |
|---|---|---|---|
| 2,770,011 A | 11/1956 | Kelly | |
| 4,344,750 A | 8/1982 | Gellert | |
| 4,345,892 A | 8/1982 | Schulte et al. | |
| 4,818,217 A | 4/1989 | Schmidt et al. | |
| 4,836,766 A | 6/1989 | Gellert | |
| 4,981,431 A * | 1/1991 | Schmidt | 425/549 |
| 5,049,062 A | 9/1991 | Gellert | |
| 5,051,086 A | 9/1991 | Gellert | |
| 5,268,184 A | 12/1993 | Gellert | |
| 5,269,677 A | 12/1993 | Gauler | |
| 5,494,433 A | 2/1996 | Gellert | |
| 5,536,165 A | 7/1996 | Gellert | |
| 5,591,465 A | 1/1997 | Babin | |
| 5,609,893 A | 3/1997 | Eastwood | |
| 5,820,899 A | 10/1998 | Gellert et al. | |
| 5,952,016 A | 9/1999 | Gellert | |
| 6,666,675 B2 * | 12/2003 | Ihara et al. | 425/549 |
| 6,688,875 B2 | 2/2004 | Babin | |
| 6,805,549 B2 | 10/2004 | Günther | |
| 6,835,060 B2 * | 12/2004 | Sicilia | 425/572 |

FOREIGN PATENT DOCUMENTS

| | | |
|---|---|---|
| DE | 7603206 U | 6/1976 |
| DE | 42 15 601 A1 | 11/1993 |
| DE | 100 08 722 A1 | 8/2001 |
| JP | 2005041020 A | 2/2005 |
| JP | 2005-132026 | 5/2005 |

* cited by examiner

*Primary Examiner*—Tim Heitbrink
(74) *Attorney, Agent, or Firm*—Medler Ferro PLLC

(57) ABSTRACT

An edge-gated injection molding apparatus includes a first, rear-mounted nozzle that is coupled to a manifold for receiving a melt stream therefrom. A second, front-mounted nozzle is coupled to the first nozzle by a nozzle link that is provided between the first and second nozzles. A plurality of gate seals are coupled to a forward end of the second nozzle. The gate seals receive melt from a plurality of melt passages and deliver the melt to a plurality of mold cavities through respective gates. The second nozzle is slidably removable from the first nozzle via the nozzle link to facilitate repair or replacement of the gate seals.

21 Claims, 6 Drawing Sheets

FRONT-MOUNTABLE, EDGE-GATING NOZZLE

CROSS-REFERENCE TO RELATED APPLICATION

This application claims the benefit under 35 U.S.C. § 119(e) of provisional U.S. Appl. No. 60/460,418 filed Apr. 7, 2003, the content of which is incorporated by reference herein in its entirety.

BACKGROUND OF THE INVENTION

1. Field of the Invention

The present invention relates generally to an injection molding apparatus and, in particular, to a front mountable edge gating nozzle that delivers melt to a number of mold cavities spaced around the nozzle.

2. Related Art

Edge gating from a nozzle of an injection molding apparatus through a number of edge gate seals is well known. A multi-cavity edge, or side, gated injection molding apparatus 100 is shown in FIG. 1 as described in U.S. Pat. No. 5,494,433 to Gellert, issued Feb. 27, 1996, which is incorporated in its entirety herein by reference thereto. Generally, the multi-cavity edge-gated injection molding apparatus 100 includes several nozzles 102, one of which is shown in FIG. 1, that are coupled to a manifold 118 to receive a melt stream of moldable material therefrom. Each nozzle 102 is mounted in a cylindrical opening 104 in a mold 106 to convey pressurized melt through a nozzle melt channel 108 to mold gates 110, which lead to mold cavities 112 in mold 106. Mold cavities 112 are spaced radially around nozzle 102. Each mold gate 110 extends through a gate insert 114, which is held in position by a gate insert retainer plate 122. Each mold gate 110 is aligned with a gate seal 116 that is threadably coupled to nozzle 102. As such, the location of gate seals 116 is generally fixed relative to the mold 106.

As illustrated in FIG. 1, manifold 118 is a "floating" manifold, which is positioned below a back plate 120 and coupled to mold 106 through nozzle 102. This arrangement allows for thermal expansion of manifold 118 and nozzle 102 in an axial direction. In such an arrangement, requisite axial thermal expansion is accommodated by having a sliding/telescopic arrangement between a sprue bushing 124 fixed to a mold back plate 120 and manifold 118. However, axial thermal expansion of nozzle 102 is restricted in a direction of the mold cavity by the relatively fixed position of gate seals 116. Consequently, gate seals 116 bear the load of both the manifold and the edge-gating nozzle during operation of the injection molding apparatus. Due to the strenuous and repetitive nature of the injection molding process, such a load condition may cause misalignment of the gate seals with their respective mold gates and excessive wear of the gate seals resulting in leakage and more frequent repair and maintenance. In order to access gate seals 116 for repair or maintenance purposes, edge-gated systems often require that the entire system be advanced forward or removed.

As such there exists a need in the injection molding industry for an edge-gated injection molding apparatus that reduces the load on the horizontal gate seals during operation and facilitates access for maintenance.

SUMMARY OF THE INVENTION

According to an embodiment of the present invention there is provided an edge-gated injection molding apparatus that during operation isolates horizontal gate seals of an edge-gated nozzle from a manifold load by having a dual nozzle arrangement between a mold cavity and the manifold. In the present invention, a rear-mounted nozzle takes the load of the manifold and a front-mounted nozzle with horizontal gate seals is allowed to float freely in order to compensate for misalignment caused by heat expansion during operation. As such, the edge-gated, front-mounted nozzle functions to keep the gate seals properly located to maintain a good seal with each corresponding mold gate.

Each rear-mounted nozzle includes a flange that is held in a corresponding shoulder of a mold plate to limit axial movement of the rear-mounted nozzle in the direction of the front-mounted nozzle. The rear-mounted nozzle flange and mold plate shoulder arrangement supports the load from the manifold but still allows the load from the manifold to be used as sealing means/force between the rear-mounted nozzle and the manifold.

The present invention includes a telescoping linking piece having a melt passage of a relatively constant diameter there through that is used to fluidly connect the melt channels of the rear- and front-mounted nozzles and to accommodate the thermal expansion of the rear-mounted nozzle and the front-mounted nozzle during operation.

An embodiment of the present invention includes an axially-fixed manifold having a manifold channel for receiving a melt stream of moldable material under pressure and for delivering the melt stream to a first nozzle channel of a first nozzle. The first nozzle having a flange for seating in a corresponding shoulder of a mold plate. A second, edge-gated nozzle is coupled to a forward end of the first nozzle, the second nozzle having a second nozzle channel for receiving the melt stream from the first nozzle channel.

This embodiment of the present invention includes a nozzle link having a melt passage of a relatively constant diameter that fluidly couples the first nozzle channel and the second nozzle channel. A first end of the nozzle link is threadably engaged with the first nozzle and a second end of the nozzle link is slidingly insertable into an aperture in the second nozzle to provide for the second nozzle being slidably removable from the first nozzle with removal of the mold plate.

The second nozzle is provided with a plurality of horizontal melt passages that radially extend from a forward end of the second nozzle channel for directing the melt stream toward a plurality of gate seals coupled thereto. A plurality of mold cavities are radially arranged about the forward end of the second nozzle to receive the melt stream from the plurality of gate seals through a plurality of mold gates. The gate seals are relatively fixed in position in an axial direction to provide horizontal alignment with the mold gates of the mold cavities.

The present invention provides an advantage in that the gate seals bear only the load of the second nozzle instead of bearing the load of the entire manifold system. The present invention provides a further advantage in that the gate seals are more easily accessible for repair, routine maintenance, and/or replacement purposes.

BRIEF DESCRIPTION OF THE FIGURES

An embodiment of the present invention will now be described more fully with reference to the accompanying drawings where like reference numbers indicate similar structure.

DETAILED DESCRIPTION OF THE INVENTION

Figure 6:
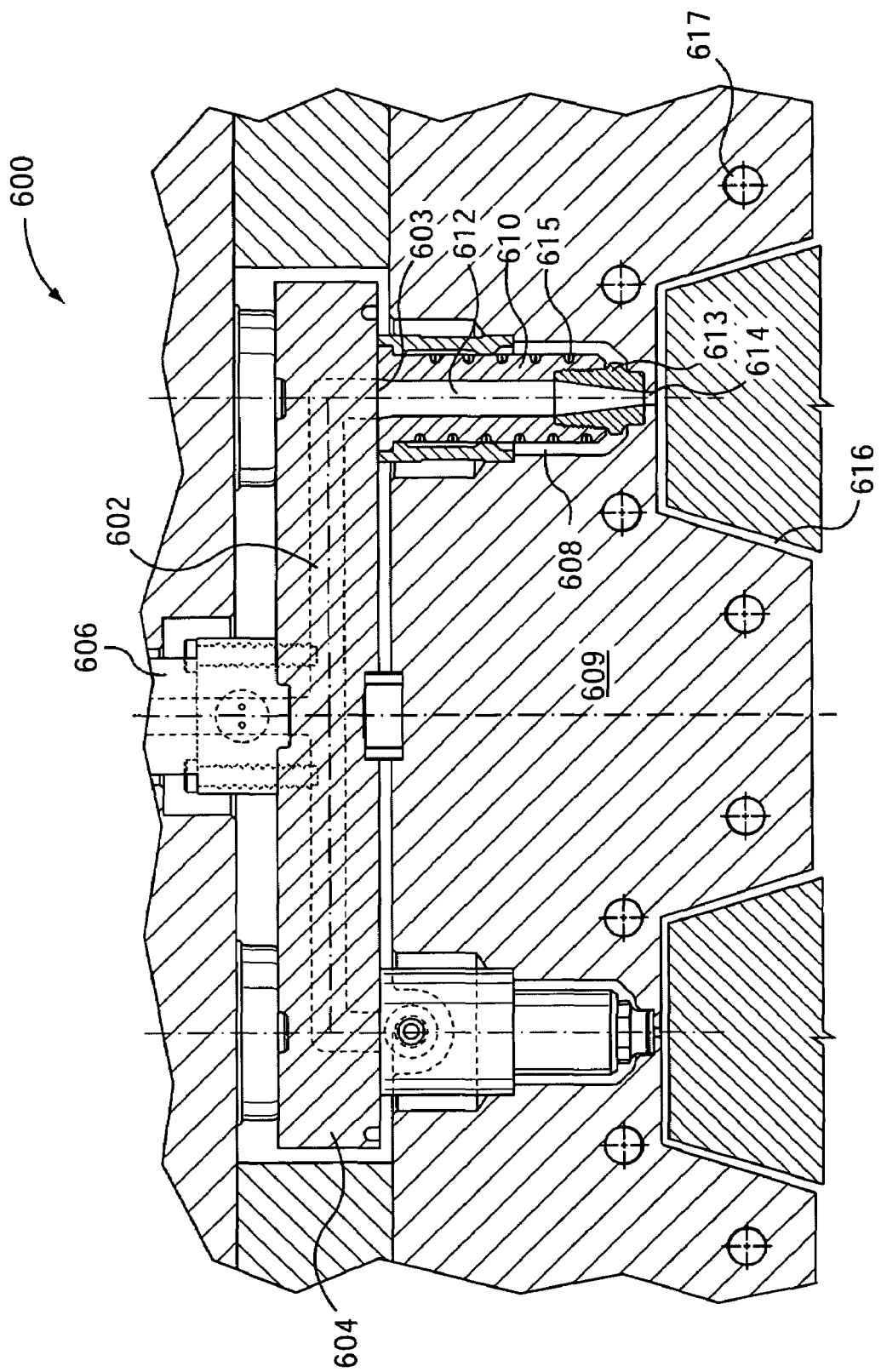
FIG. 6 is a cross-sectional view of an injection molding apparatus in which the present invention may be used.

The present invention is intended to be used in an injection molding environment as shown in FIG. 6, which is a partial cross-sectional view of an injection molding system 600. A manifold melt channel 602 extends through a hot runner manifold 604 and is in fluid communication with a melt source from a machine nozzle (not shown) via a sprue bushing 606. A nozzle 610 is positioned within a nozzle cutout 608 of a cavity plate 609. A nozzle melt channel 612 of nozzle 610 is in fluid communication with manifold melt channel 602 for receiving a melt therefrom. Particularly, the melt passes from manifold melt channel 602 through a manifold outlet 603 into nozzle melt channel 612. Nozzle melt channel 612 carries the melt through a nozzle tip 613 towards a mold gate 614 that leads to a mold cavity 616. Conventional injection molding apparatus 600 includes heaters 615 positioned about nozzle 610 and cooling channels 617 in mold plate 609.

Figure 1:
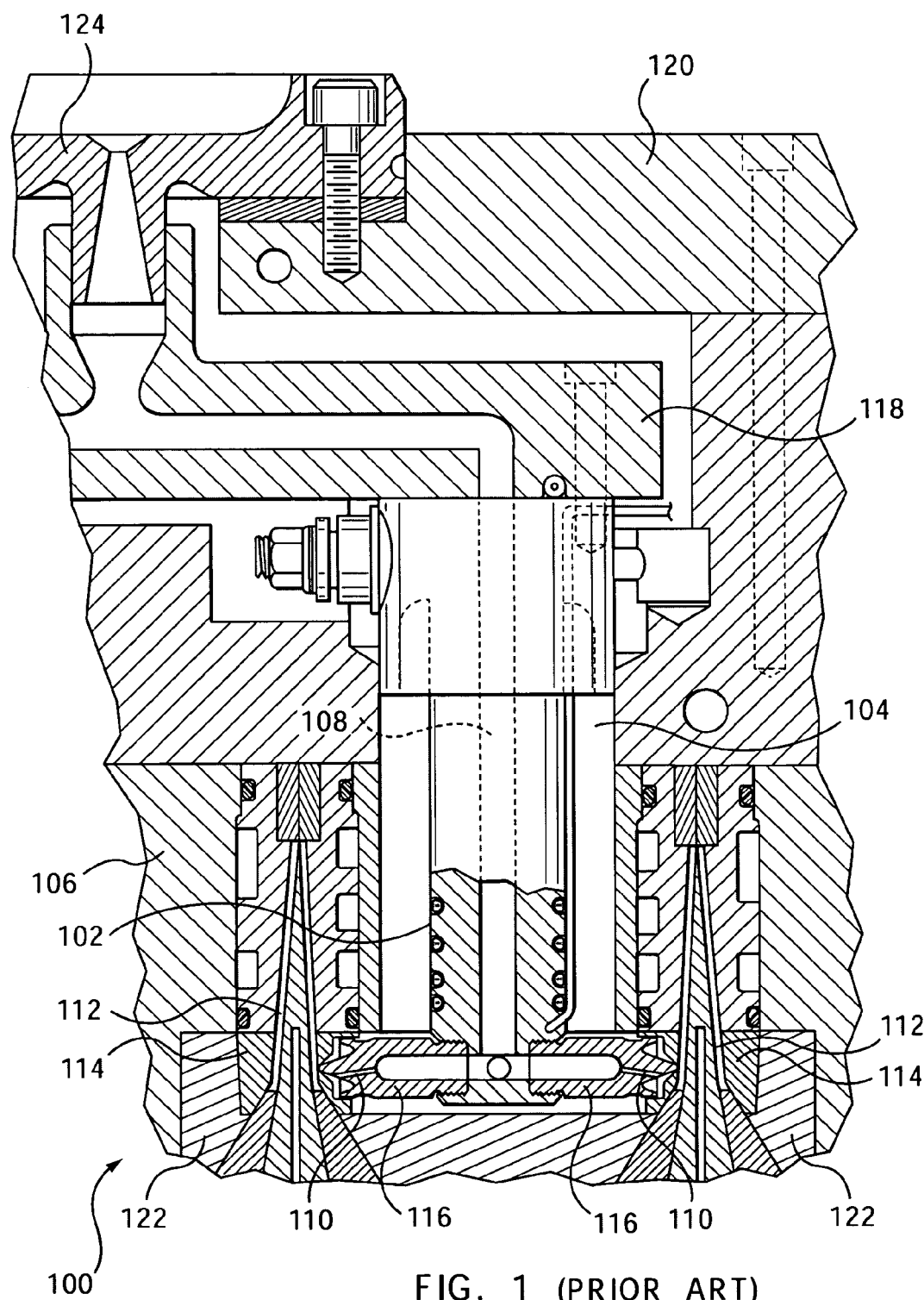
FIG. 1 is a partial cross-sectional view of a conventional edge-gated injection molding apparatus.
Figure 2:
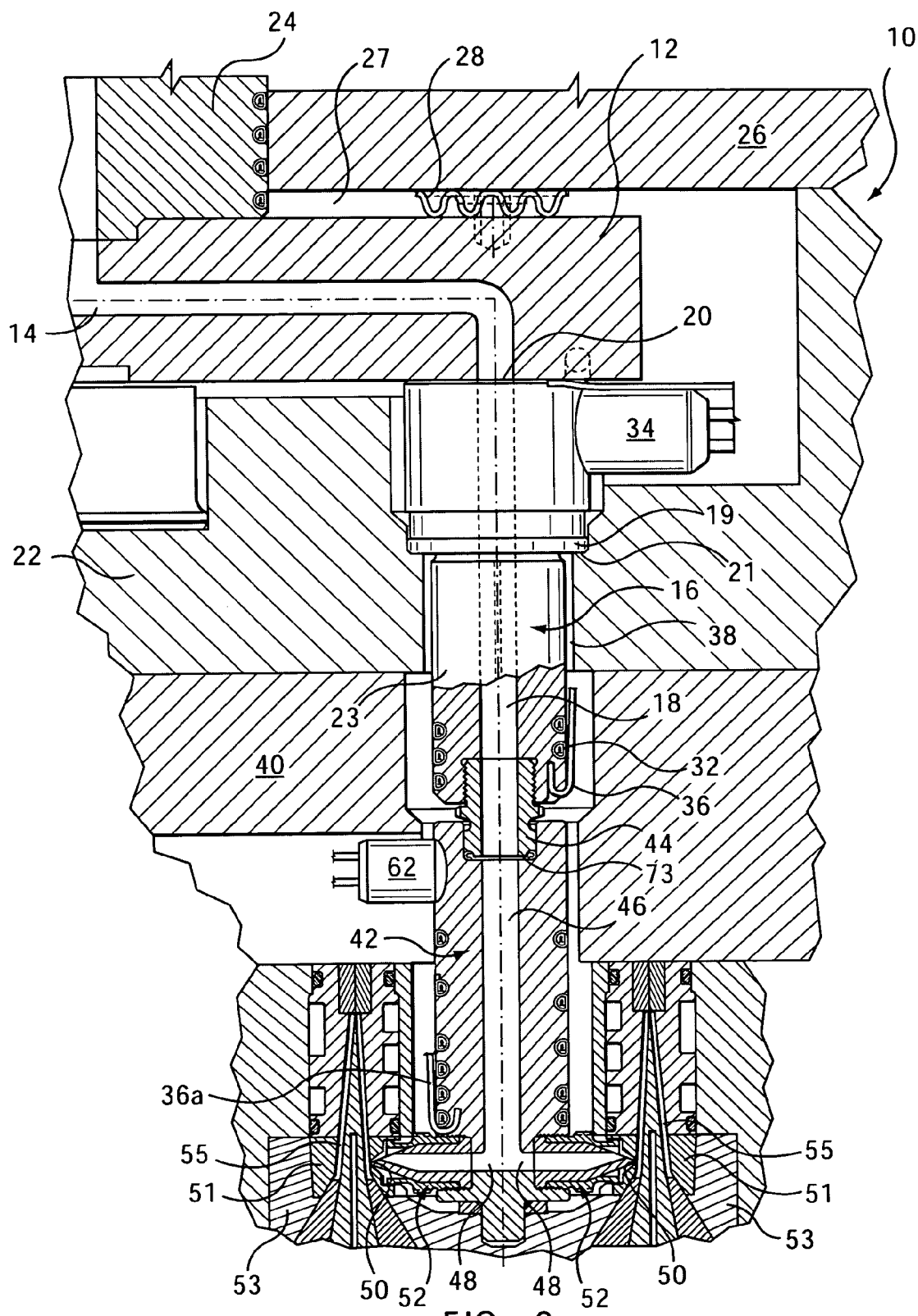
FIG. 2 is a partial cross-sectional view of a portion of an injection molding apparatus according to an embodiment of the present invention.
Figure 3:
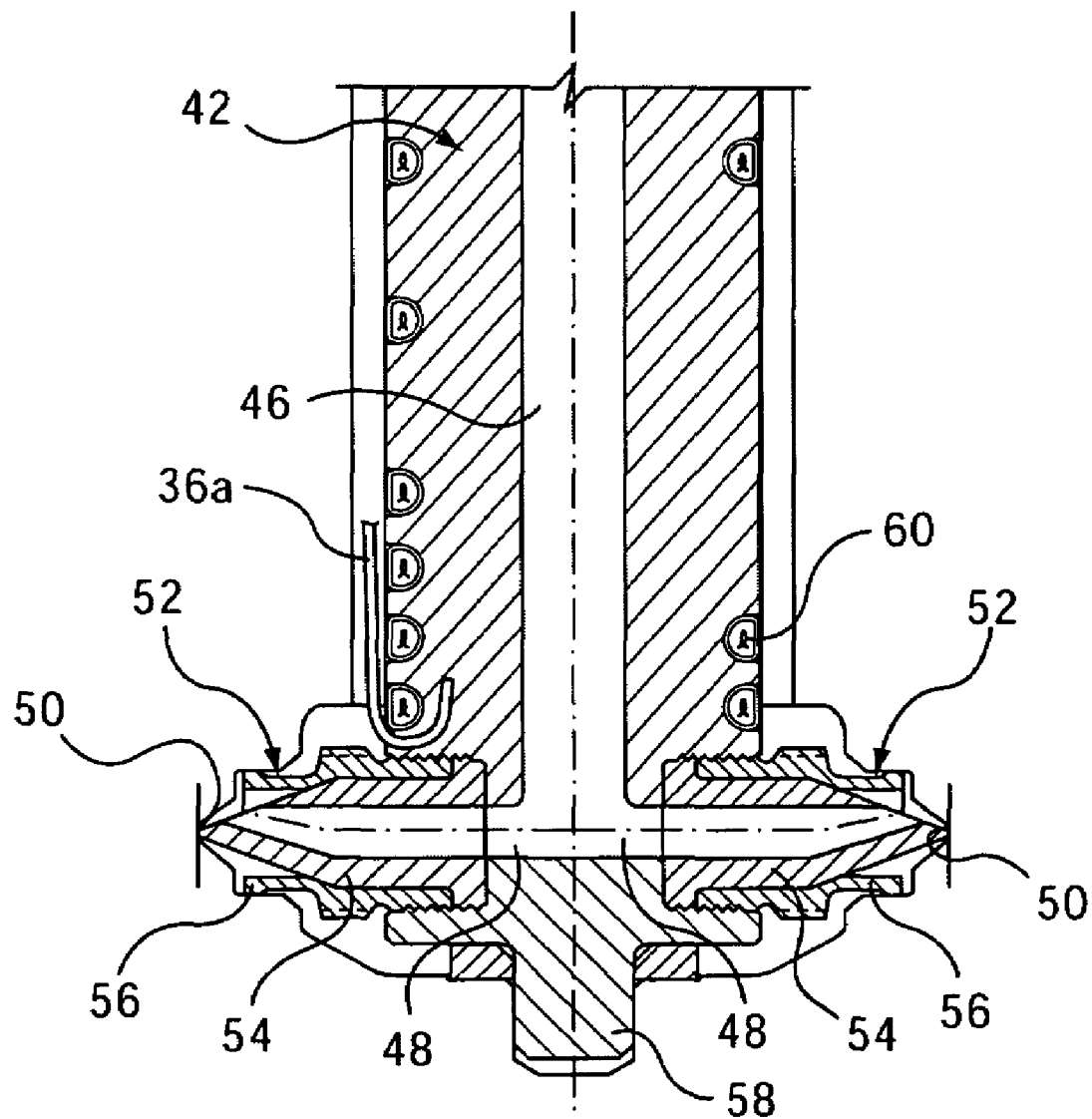
FIG. 3 is an enlarged view of a portion of FIG. 2.
Figure 4:
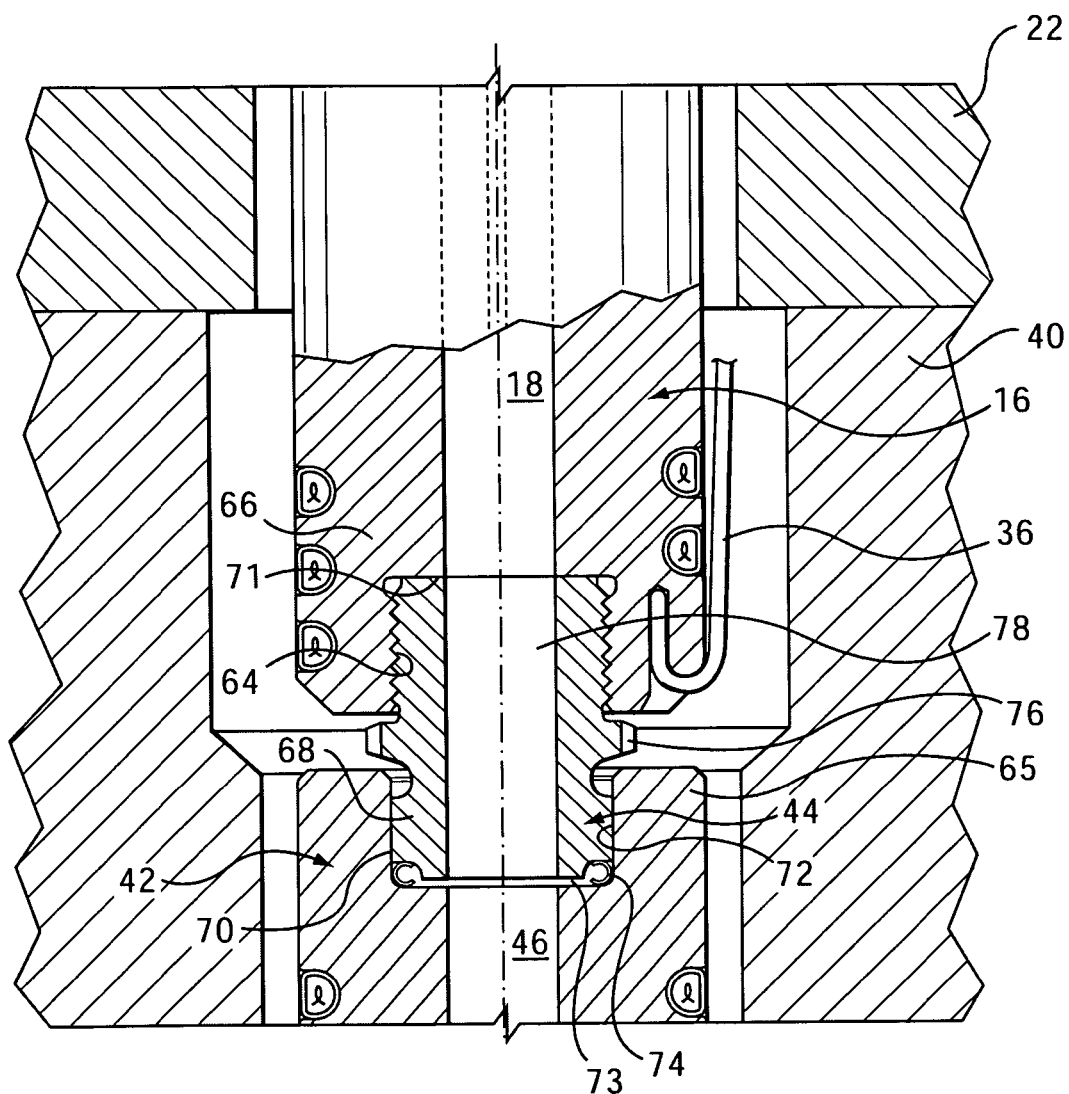
FIG. 4 is an enlarged view of a portion of FIG. 3.

An edge-gated injection molding apparatus in accordance with the present invention is illustrated in FIGS. 2–4 and is generally indicated by reference numeral 10. Injection molding apparatus 10 includes a manifold 12 that is located between a mold plate 22, a sprue bushing 24 and a back plate 26. A disk 28 restricts movement of the manifold 12 relative to the mold plate 22 and back plate 26 to axially fix the position of manifold 12. As such during operation, the manifold is effectively prevented from flexing in a direction of the back plate due to thermal expansion. An air space 27 is provided between the manifold 12 and the back plate 26. A machine nozzle (not shown) delivers a melt stream of molten material under pressure to a manifold channel 14 of the manifold 12 through sprue bushing 24. The disk 28 also helps to focus the force from manifold 12 directly over first nozzle 16 to aid in sealing manifold 12 to first nozzle 16. Disk 28 maintains insulating air gap 27 between manifold 12 and back plate 26. Generally this disk is designed to provide minimum contact between manifold 12 and back plate 26 and is capable of flexing to absorb some of the forces therebetween.

A plurality of first, rear-mounted nozzles 16 are coupled to the manifold 12. Each first nozzle 16 includes a first nozzle channel 18 that is aligned with a respective manifold outlet 20 to receive the melt stream from the manifold channel 14. Each first nozzle 16 has a flange portion 19 that sits in a corresponding shoulder portion 21 of mold plate 22. The flange being held in the corresponding shoulder of the mold plate acts to limit axial movement of the rear-mounted nozzle in the direction of a front-mounted nozzle 42 described below. During operation, the rear-mounted nozzle flange and mold plate shoulder arrangement supports the load from the manifold while still allowing the load from the manifold to be used as a sealing means/force between the rear-mounted nozzle and the manifold.

A nozzle body portion 23 of first nozzle 16 extends through an opening 38, which extends through mold plate 22 and a cavity plate 40. Nozzle heaters 32 are coupled about nozzle body 23 of each first nozzle 16 to provide heat thereto. The nozzle heaters 32 are in communication with a power source (not shown) through an electrical connector 34. A thermocouple 36 is coupled to the first nozzle 16 to provide temperature measurements thereof.

With reference to FIGS. 2 and 3, a second, front-mounted nozzle 42 is shown coupled to the first, rear-mounted nozzle 16 by a nozzle link 44, which is described in greater detail below. The second nozzle 42 is an edge-gating nozzle that includes a second nozzle channel 46, which is aligned with the first nozzle channel 18 of first nozzle 16 for receiving melt therefrom. Gate seals 52 having melt passages 48 laterally extend from second nozzle channel 46 to deliver melt through gates 50 to a series of mold cavities 55. Mold cavities 55 are radially spaced around an edge-gated tip portion of the second nozzle 42, as illustrated in FIG. 2.

With reference to FIG. 2, gate seals 52 threadably engage the second nozzle 42 to deliver melt from the melt passages 48 to mold cavities 55 via gates 50. The structure surrounding each gate seal 52 includes a gate insert 51 that is retained by a gate insert retainer 53. Such an arrangement is shown and described in U.S. Pat. No. 5,536,195 to Gellert that is incorporated by reference in its entirety herein.

In the embodiment of FIGS. 2 and 3, gate seals 52 are of a two part construction including a tip 54 that is surrounded by a seal 56. The gate seal 52 may be bi-metallic, for example, the seal 56 may be comprised of H13 steel and the tip 54 may be comprised of carbide or beryllium copper. The seal 56 and tip 54 are not limited to being metallic and therefore, the gate seal 52 may be comprised of any suitable material combination. The seal 56 and the tip 54 may alternatively be comprised of the same material. Gate seals 52 are longitudinally-fixed in position relative to each respective mold gate 50 and mold cavity due to the gate insert and the gate insert retainer, as shown with reference to the embodiment of FIG. 5.

The second nozzle 42 includes a projection 58 that further locates the second, front-mounted nozzle 42 relative to the cavity plate 40. Nozzle heaters 60 and thermocouples 36a are coupled to each second nozzle 42 to measure a temperature of the nozzle and provide heat thereto. The nozzle heaters 60 are in communication with a power source (not shown) through an electrical connector 62.

In the embodiment of the present invention illustrated in FIG. 4, nozzle link 44 includes a first end 64, which is threaded for engaging first nozzle 16 and a second end 68 for engaging the second nozzle 42. First end 64 is disposed in an aperture 71 of a forward end 66 of first nozzle 16. Aperture 71 has corresponding threads to engage the threads of first end 64 of nozzle link 44. The second end 68 of nozzle link 44 is nested in an aperture 72 that is provided in a rear end 65 of second nozzle 42. The second end 68 has a smooth outer surface 70 to allow second nozzle 42 to be slidably removed from the nozzle link 44. The nozzle link 44 includes a melt passage 78 of a constant diameter, which allows melt to flow from the first nozzle channel 18 to the second nozzle channel 46 without a discernable drop in pressure therebetween.

In cold conditions, a gap 73 is maintained between second end 68 of nozzle link 44 and aperture 72 of second nozzle 42. In operating conditions with the high temperatures thereof, gap 73 of nozzle link 44 is reduced or even consumed by the thermal expansion of the first and second nozzles. A collapsible O-ring 74 is provided between aperture 72 of second nozzle 42 and second end 68 of nozzle link 44 for sealing purposes so that melt does not escape. In the embodiment of the present invention shown in FIG. 4, a tooling projection 76 having a hexagonal outer profile is provided to facilitate installation and removal of the nozzle link 44.

Nozzle link 44 of the present invention allows second nozzle 42 to be removed from first nozzle 16 for repair and maintenance purposes by sliding second nozzle 42 off of nozzle link 44. Further nozzle link 44 is sized to accommodate the thermal expansion, i.e., axial growth, of the first and second nozzles that occurs at the high operating temperatures of an injection molding process. Accordingly in this embodiment of the present invention during operation of the injection molding apparatus, thermal expansion of second nozzle 42 and first nozzle 16 relative to each other is accommodated by gap 73 of nozzle link 44.

In one embodiment of the present invention, nozzle link 44 may be made from a material having a higher thermal conductivity than the nozzles, such that during operation it will expand within aperture 72 of second nozzle 42 to provide an additional sealing means.

In operation, edge-gated injection molding apparatus 10 is heated to an operating temperature, which causes the components including the manifold 12 and first and second nozzles 16, 42 to expand. Manifold 12 is relatively fixed in position on one surface by the interaction between disk 28 and back plate 26 and on the other surface by first nozzle 16, more particularly by the interaction between flange 19 of first nozzle 16 and shoulder 21 of mold plate 22. Gate seals 52 of an edge-gated tip portion of second nozzle 42 are also relatively fixed in position with respect to mold gates 50. As such, the thermal expansion of the system is accommodated by the interaction of nozzle link 44 with first and second nozzles 16, 42.

A melt stream of molten material is delivered under pressure from a machine nozzle (not shown) to manifold channel 14 of manifold 12. The melt is distributed from manifold channel 14 to nozzle channels 18 of a plurality of first nozzles 16. The melt flows from the nozzle channels 18, through melt passages 78 of nozzle links 44 and into the second nozzle channels 46. From the second nozzle channels 46, the melt is conveyed through melt passages 48, through gate seals 52, past gates 50 and into a respective mold cavity. Once the injection portion of the cycle is complete, the molded parts are cooled and ejected from the mold cavities.

Figure 5:
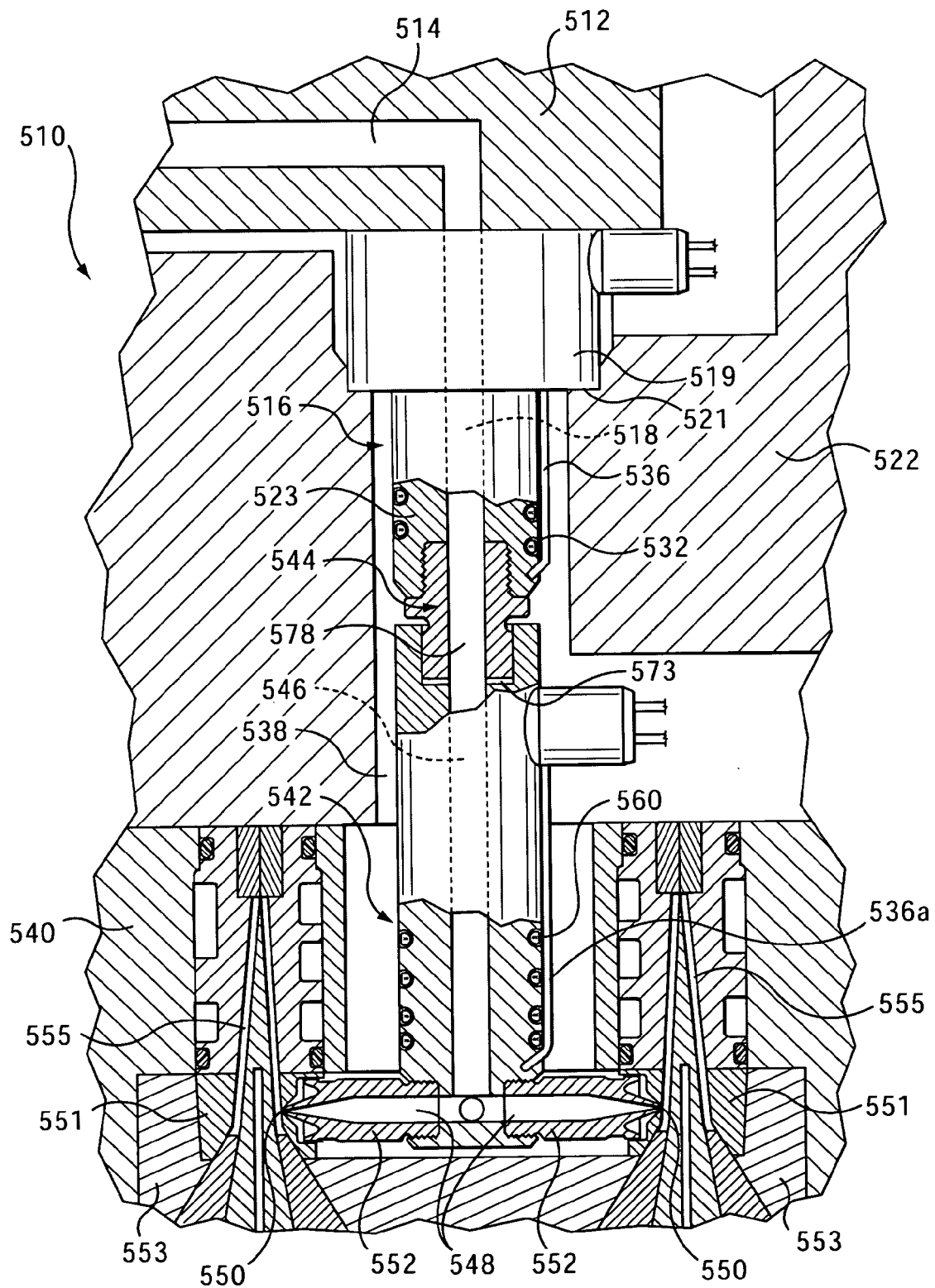
FIG. 5 is a partial cross-sectional view of an edge-gated system according to another embodiment of the present invention.

An edge-gated injection molding apparatus in accordance with another embodiment of the present invention is illustrated in FIG. 5 and is generally indicated by reference numeral 510. Injection molding apparatus 510 includes a manifold 512 having a manifold channel 514 and is relatively fixed in position as described above with reference to the embodiment of FIGS. 2–4.

In this embodiment a plurality of first, rear-mounted nozzles 516 are fluidly coupled to the manifold 512, each of which includes a first nozzle channel 518 fluidly coupled to a respective manifold channel 514. First nozzle 516 includes a body portion 523 that extends through an opening 538 of a mold plate 522 and a cavity plate 540. Each first nozzle 516 also includes a flange portion 519 that sits in a corresponding shoulder portion 521 of mold plate 522. The flange being held in the corresponding shoulder of the mold plate to act in limiting axial movement of the rear-mounted nozzle in the direction of a front-mounted nozzle 542 described below. During operation, the rear-mounted nozzle flange and mold plate shoulder arrangement acts in the same manner as described above with reference to the embodiment of FIGS. 2–4.

The embodiment of the present invention illustrated in FIG. 5 includes a second, front-mounted nozzle 542 fluidly coupled to first nozzle 516 by a nozzle link 544, which is described in greater detail below. Second nozzle 542 is an edge-gating nozzle that includes a second nozzle channel 546 for receiving melt from first nozzle channel 518. Radially extending melt passages 548 branch out from second nozzle channel 546 to deliver melt through gates 550 to a series of mold cavities 555. Mold cavities are radially spaced around an edge-gated tip portion of second nozzle 542. The structure surrounding mold cavities 555 includes a gate insert 551 that is retained by a gate insert retainer 553.

One-piece gate seals 552 threadably engage second nozzle 542 to deliver melt from melt passages 548 to mold cavities 555 via mold gates 550. Each gate seal 552 is longitudinally fixed in position relative to each respective mold gate 550 and mold cavity 555 due to its respective gate insert 551 and gate insert retainer 553 being fixed within a mold plate 540.

As illustrated in FIG. 5, each of first nozzle 516 and second nozzle 542 includes a heater 532, 560 and respective thermocouples 536, 536a for heating the melt therein. In the embodiment, nozzle link 544 is coupled to first nozzle 516 and second nozzle 542 in a similar manner as described above with a gap 573 between nozzle link 544 and an aperture of second nozzle 542. Nozzle link 544 includes a melt passage 578 of a constant diameter, which allows melt to flow from first nozzle channel 518 to second nozzle channel 546 without an undesirable drop in pressure therebetween. In this embodiment, an O-ring is not used and a sealing force is achieved during operation by the thermal expansion of first nozzle 516 and second nozzle 542 within gap 573 of nozzle link 544.

The embodiment of the present invention of FIG. 5 operates in a like manner as described above with reference to the embodiment of FIGS. 2–4.

Accordingly, the embodiments of the present invention do not require that the manifold "float" to accommodate the thermal expansion of the system during operation. Instead, the manifold and nozzle gate seals may both be relatively fixed in position because the nozzle link allows for thermal expansion within the intersection of the first and second nozzles.

In each embodiment of the present invention described above, in order to gain access to the gate seals or the second nozzles for repair or regular scheduled maintenance, the cavity plate need only be removed without disturbing the remainder of the injection molding apparatus. The second nozzle may then be slidably removed from the nozzle link to allow for repair or replacement. The gate seals are also removable from the second nozzles and may similarly be repaired or replaced.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having at least one manifold channel for receiving a melt stream of moldable material under pressure;
   a first nozzle having a first nozzle channel in fluid communication with the manifold channel;
   a second nozzle in fluid communication with the first nozzle, the second nozzle having a second nozzle channel;
   a nozzle link provided between the first nozzle and the second nozzle and having a nozzle link melt passage for fluidly coupling the first nozzle channel and the second nozzle channel, wherein the second nozzle is slidably removable from the first nozzle via the nozzle link;
   a plurality of gate seals coupled to a forward end of the second nozzle and having melt passages that radially extend from a forward end of the second nozzle channel.

2. The injection molding apparatus of claim 1, wherein a first end of the nozzle link is threadably attachable to the first nozzle and a second end of the nozzle link is slidably insertable within an aperture of the second nozzle.

3. The injection molding apparatus of claim 2, wherein a seal is provided within the aperture between the nozzle link and the second nozzle.

4. The injection molding apparatus of claim 3, wherein the seal is a collapsible O-ring.

5. The injection molding apparatus of claim 1, wherein under operating conditions the gate seals of the second nozzle are longitudinally fixed in position and thermal expansion of the second nozzle is accommodated by the nozzle link.

6. The injection molding apparatus of claim 5, wherein the manifold is longitudinally fixed in position such that under operating conditions thermal expansion of the first nozzle is accommodated by the nozzle link.

7. The injection molding apparatus of claim 1, further comprising:
   a first heater thermally coupled to the first nozzle; and
   a second heater thermally coupled to the second nozzle.

8. The injection molding apparatus of claim 1, further comprising:
   a plurality of mold cavities, wherein each mold cavity is in fluid communication with a respective gate seal of the second nozzle.

9. The injection molding apparatus of claim 1, wherein the second nozzle is axially slidable relative to the nozzle link under operating conditions.

10. The injection molding apparatus of claim 1, wherein the nozzle link melt passage is of a substantially constant diameter.

11. An injection molding apparatus comprising:
    a manifold having a manifold channel for receiving a melt stream of moldable material under pressure;
    a first nozzle having a first nozzle channel in fluid communication with the manifold channel;
    a second nozzle in fluid communication with the first nozzle, the second nozzle having a second nozzle channel;
    a nozzle link provided between the first nozzle and the second nozzle and having a nozzle link melt passage of a substantially constant diameter extending there through for fluidly coupling the first nozzle channel and the second nozzle channel, wherein the second nozzle is slidably removable from the first nozzle via the nozzle link.

12. The injection molding apparatus of claim 11, further comprising:
    a first heater thermally coupled to the first nozzle; and
    a second heater thermally coupled to the second nozzle.

13. The injection molding apparatus of claim 11, wherein a first end of the nozzle link is threadably attachable to the first nozzle and a second end of the nozzle link is slidably insertable within an aperture of the second nozzle.

14. The injection molding apparatus of claim 13, wherein a seal is provided within the aperture between the nozzle link and the second nozzle.

15. The injection molding apparatus of claim 14, wherein the seal is a collapsible O-ring.

16. The injection molding apparatus of claim 11, further comprising:
    a plurality of melt passages extending from a forward end of the second nozzle channel; and
    a plurality of gate seals, wherein each gate seal is in fluid communication with a respective melt passage of the second nozzle and coupled thereto.

17. The injection molding apparatus of claim 16, wherein under operating conditions the gate seals of the second nozzle are longitudinally fixed in position and thermal expansion of the second nozzle is accommodated by the nozzle link.

18. The injection molding apparatus of claim 17, wherein the manifold is longitudinally fixed in position such that under operating conditions thermal expansion of the first nozzle is accommodated by the nozzle link.

19. The injection molding apparatus of claim 11, wherein the nozzle link is made from a material with a greater thermal conductivity than a material of the second nozzle.

20. The injection molding apparatus of claim 11, wherein the second nozzle is axially slidable relative to the nozzle link under operating conditions.

21. The injection molding apparatus of claim 20, wherein an end surface of the nozzle link is in a first axial position relative to the second nozzle under cold conditions and in a second axial position relative to the second nozzle under operating conditions.

* * * * *